United States Patent
Haas et al.

(10) Patent No.: US 7,898,794 B2
(45) Date of Patent: Mar. 1, 2011

(54) TANTALUM POWDER FOR THE PRODUCTION OF SOLID ELECTROLYTE CAPACITORS

(75) Inventors: Helmut Haas, Achim (DE); Ulrich Bartmann, Goslar (DE)

(73) Assignee: H. C. Starck GmbH, Goslar (DE)

( * ) Notice: Subject to any disclaimer, the term of this patent is extended or adjusted under 35 U.S.C. 154(b) by 723 days.

(21) Appl. No.: 11/576,718

(22) PCT Filed: Sep. 24, 2005

(86) PCT No.: PCT/EP2005/010361
§ 371 (c)(1),
(2), (4) Date: Dec. 20, 2007

(87) PCT Pub. No.: WO2006/037497
PCT Pub. Date: Apr. 13, 2006

(65) Prior Publication Data
US 2008/0094779 A1    Apr. 24, 2008

(30) Foreign Application Priority Data
Oct. 8, 2004    (DE)    ........................ 10 2004 049 040

(51) Int. Cl.
*H01G 9/042*    (2006.01)
(52) U.S. Cl. ........................ 361/509; 361/516; 361/519; 361/523; 361/525; 361/528
(58) Field of Classification Search ................ 361/523, 361/516–519, 525–529, 540–541, 509, 508; 75/365, 369, 343, 245
See application file for complete search history.

(56) References Cited

U.S. PATENT DOCUMENTS

| | | | |
|---|---|---|---|
| 5,986,877 A | 11/1999 | Pathare et al. | |
| 6,136,062 A * | 10/2000 | Loffelholz et al. | 75/369 |
| 6,171,363 B1 * | 1/2001 | Shekhter et al. | 75/369 |
| 6,238,456 B1 | 5/2001 | Wolf et al. | |
| 6,611,421 B2 * | 8/2003 | Meadows et al. | 361/328 |
| 6,786,951 B2 * | 9/2004 | He et al. | 75/365 |
| 6,791,821 B1 * | 9/2004 | Monnett | 361/509 |
| 6,952,339 B1 * | 10/2005 | Knowles | 361/528 |
| 7,116,548 B2 * | 10/2006 | Satterfield et al. | 361/528 |
| 7,142,408 B2 * | 11/2006 | Wang | 361/523 |
| 2003/0230167 A1 | 12/2003 | Loeffelholz et al. | |

FOREIGN PATENT DOCUMENTS

| | | |
|---|---|---|
| RU | 2210463 C2 | 8/2003 |
| RU | 2236930 A | 1/2005 |
| WO | WO-97/40199 A1 | 10/1997 |

* cited by examiner

*Primary Examiner*—Nguyen T Ha
(74) *Attorney, Agent, or Firm*—Connolly Bove Lodge & Hutz LLP

(57) ABSTRACT

A tantalum powder consisting of agglomerated primary particle with a minimum primary particle dimension of 0.2 to 0.8 µm, a specific surface area of 0.9 to 2.5 m²/g and a particle size distribution determined to ASTM B 822 corresponding to a D10 value of 5 to 25 µm, a D50 value of 20 to 140 µm and a D90 value of 40 to 250 µm, wherein the powder does not comprise an effective content of sintering protection agents.

10 Claims, 1 Drawing Sheet

TANTALUM POWDER FOR THE PRODUCTION OF SOLID ELECTROLYTE CAPACITORS

RELATED APPLICATIONS

Figure 1:
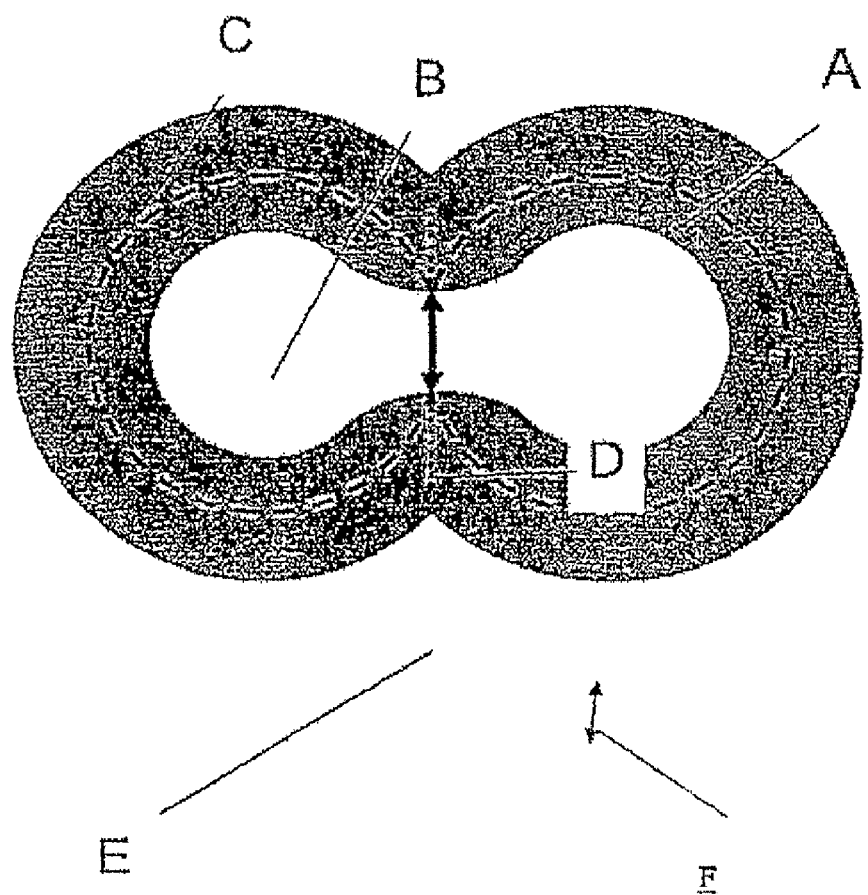

This application is a national stage application (under 35 U.S.C. 371) of PCT/EP2005/010361 filed Sep. 24, 2005, which claims the benefit of German application 10 2004 049 040.6 filed Oct. 8, 2004.

BACKGROUND OF THE INVENTION

1. Field of the Invention

The present invention relates to the production of solid electrolyte capacitors based on tantalum, in particular those with an elevated specific capacitance of greater than 70,000 µFV/g.

2. Description of the Related Art

Predominantly used solid electrolyte capacitors with a very large active capacitor area and thus a small size suitable for mobile communications electronics are those with a tantalum pentoxide barrier layer applied onto a corresponding conductive tantalum metal support, making use of the stability thereof ("valve metal"), the comparatively high dielectric constant and the insulating pentoxide layer with a highly uniform layer thickness which may be produced electrochemically. The metallic support, which simultaneously constitutes one electrode (anode) of the capacitor, consists of a highly porous, sponge-like structure which is produced by pressing and sintering ultrafinely divided primary structures or secondary structures which are already sponge-like. The stability of the compression moulding is here essential to further processing to yield the sintered article, which constitutes the actual support structure or anode of the capacitor. The surface of the support structure is electrolytically oxidised ("formed") to yield the pentoxide, the thickness of the pentoxide layer being determined by the maximum electrolytic oxidation voltage ("forming voltage"). The counter-electrode is produced by impregnating the sponge-like structure with manganese nitrate, which is thermally converted into manganese dioxide, or with a liquid precursor of a polymer electrolyte and polymerisation. The electrical contacts to the electrodes are provided, on the one hand, by a tantalum or niobium wire placed in the press mould prior to sintering and, on the other hand, by the metallic capacitor casing which is insulated relative to the wire. The strength with which the wire is sintered to the anode structure is another significant property for further processing to form the capacitor.

The capacitance C of a capacitor is calculated using the following formula:

$$C = (F \cdot \in)/d$$

where F denotes the capacitor surface area $\in$ the dielectric constant, d the thickness of the insulator layer.

The quality of such solid electrolyte capacitors substantially depends on the formation of the sponge-like anode structure, in particular the branching of the open pore structures from relatively large down to ultrafine pores. After formation of the insulator layer, one third of which grows into the original anode structure and two thirds of which grows thereon, the sponge-like structure must, on the one hand, still comprise a continuous electrically conductive structure and, on the other hand, provide a communicating open pore structure, so that the cathode formed therein can completely contact the surface of the insulation layer.

Developments in recent years have led to the use of ever more finely divided primary powders, in particular because modern communications electronics operate at a lower voltage. The consequently possible reduced insulation layer thickness makes it possible, with a finer primary structure dimension, still to obtain a continuous anode structure and, after anodisation, still to provide a communicating pore structure.

The sponge-like anode structure is here produced by finely divided primary and secondary structures starting from a generally multistage production method for powder agglomerates, together with pressing and sintering of the agglomerates, wherein excessive sintering is prevented by using sintering protection doping with nitrogen and/or phosphorus, and earlier also boron, silicon, sulfur, arsenic. Sintering activity, which was here sometimes excessively reduced for the purposes of agglomeration, was counteracted by simultaneous reduction ("deoxidising agglomeration"), the simultaneous deoxidation reaction bringing about an increase in surface atomic mobility.

Economically viable production of tantalum capacitors thus entails a number of compromises in order to obtain not only intermediates with favourable further processing characteristics, bit also the desired capacitor characteristics.

BRIEF SUMMARY OF THE INVENTION

The object of the invention is to extend the range of possible compromises, i.e. to provide a powder for capacitor production which makes it possible to produce capacitors with a wider range of characteristics or to produce capacitors with specific characteristics under less stringent processing restrictions.

Further objects of the invention may straightforwardly be derived from the following description of the invention.

It has been found that this may be achieved if sintering protection doping is completely dispensed with.

A DETAILED DESCRIPTION OF THE INVENTION

The present invention accordingly provides tantalum powders which consist of agglomerated primary particles with a minimum dimension of 0.2 to 0.8 µm, a specific surface area of 0.9 to 2.5 m²/g and a particle size distribution determined to ASTM B 822 corresponding to a D10 value of 5 to 40 µm, a D50 value of 20 to 140 µm and a D90 value of 40 to 250 µm, wherein the powder does not comprise an effective content of sintering protection agents.

Preferred tantalum powders according to the invention have a content of substances known to have a sintering protection action of P<40 ppm,
N<400 ppm,
B<10 ppm,
Si<20 ppm,
S<10 ppm and
As<10 ppm.

The phosphorus content should particularly preferably be below 10 ppm, the nitrogen content below 200 ppm. Tantalum powders with a nitrogen content of below 100 ppm are in particular preferred.

Whether a content of foreign substances in the tantalum powders provides a sintering protection action is dependent both upon the quantity thereof and upon the manner in which they are present in the powders. A surface content of nitrogen of 400 ppm may accordingly still be effective as a sintering protection agent, while uniform doping through the volume of the powder particles is generally ineffective.

The powders according to the invention are particularly preferably distinguished by containing no doping elements which are effective as sintering protection agents other than in quantities of unavoidable impurities.

It is considered surprising that the tantalum powders according to the invention may be processed into capacitors with a very low residual current, since, according to the teaching of the prior art, sintering protection doping has regularly also been used to reduce residual current.

After pressing into a cylindrical shape of a diameter of 5.1 mm and a length of 5.1 mm at a compressed density of 5.0 g/cm$^3$, tantalum powders according to the invention exhibit Chatillon compressive strength of greater than 4 kg, preferably of greater than 5 kg.

The present invention also provides solid electrolyte capacitor, anodes made from tantalum with a specific surface area of 0.5 to 1 m$^2$/g which comprise substantially no sintering protection agents.

The present invention furthermore provides solid electrolyte capacitors with an anode according to the invention which exhibit a specific capacitance of 40,000 to 150,000 µFV/g, preferably of 70,000 to 150,000 µFV/g.

Figure 2:
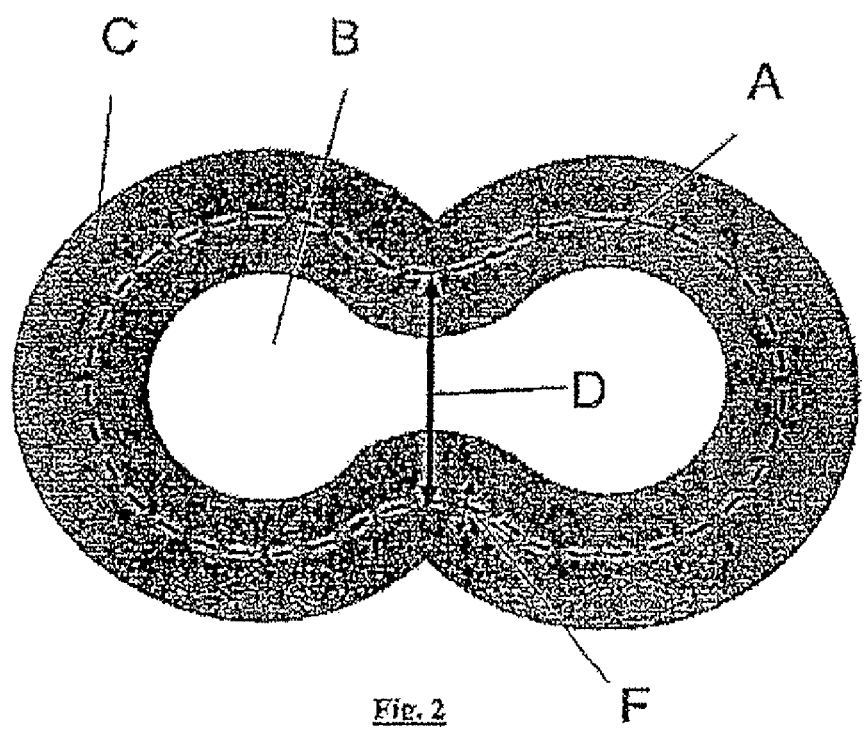

FIGS. 1 and 2 provide a schematic explanation of the effect underlying the invention: in the Figures, A denotes the cross-sectional outline (dashed line) of two sintered primary particles with the sintered bridge D. When agglomeration proceeds in the presence of sintering protection doping with phosphorus or nitrogen (FIG. 1), the sintered bridge exhibits a relatively sharp notch, whereas when agglomeration proceeds (according to the invention) without sintering protection doping (FIG. 2), the sintered bridge notch is "smoothed out". In the schematic representation of the Figures, the contact area between the primary particles formed by the sintered bridge and represented by the double-headed arrow D is approximately three times larger in FIG. 2 than in FIG. 1. The zone shown in grey indicates the pentoxide layer after anodisation, approx. ⅓ of the thickness of which perpendicular to the surface (dashed line) has grown inwards into the original metal structure and approx. ⅔ of which has grown out therefrom.

Anodes produced from the powders according to the invention exhibit extraordinarily low specific residual currents and excellent dielectric strength. The reason for this may well also be explicable from FIGS. 1 and 2. While in the case of anodes sintered with sintering protection doping (FIG. 1), during growth of the pentoxide layer a "seam", at which the growth borders of the two particles coalesce, is formed at the notch line of the sintered bridge between the two primary particles, this is not the case with the powder according to the invention (FIG. 2). Such a "growth seam" is, however, an accumulation point for impurities and stacking defects in the atomic range and thus the basis for leakage or residual current or overvoltage breakdowns.

Examples

A finely divided, partially sintered starting tantalum pentoxide is used which has an average primary particle size of approx. 2.5 µm (visually determined from SEM micrographs), a particle size distribution determined to ASTM B 822 (Malvern Mastersizer Sµ instrument) corresponding to a D10 value of 5.7 µm, a D50 value of 28.3 µm and a D90 value of 72.1 µm, and a specific surface area (BET) determined to ASTM D 3663 of 0.54 m$^2$/g.

The starting tantalum pentoxide was produced in a manner known per se by reaction of a fluorotantalic acid with ammonia solution, separation, washing and drying of the precipitated tantalum hydroxide, calcining of the hydroxide in air and screening of the product to less than 600 µm with subsequent stabilising calcination under argon at 1,700° C. for 4 hours followed by comminution and screening.

The starting tantalum pentoxide is placed onto an interwoven tantalum wire fabric in a furnace lined with tantalum sheet over a crucible which contains 1.1 times the stoichiometric quantity (relative to the oxygen content of the pentoxide) of magnesium. The furnace comprises heating means and a gas inlet aperture under the crucible containing the magnesium and a gas outlet aperture above the bed of tantalum peroxide. The furnace is flushed with argon before heating to reduction temperature. During reduction, argon flows slowly through the furnace under standard pressure. After completion of the reaction and cooling of the furnace, oxygen is gradually introduced into the furnaces in order to passivate the metal powder against burning up. The magnesium oxide formed is removed by washing with sulfuric acid and then with demineralised water to neutrality.

After reduction, the powder has an average primary particle size, determined from SEM micrographs, of approx. 0.2 µm, a BET specific surface area of 2.3 m$^2$/g and particle size distribution to ASTM B 822 corresponding to D10 of 16.3 µm, D50 of 31.7 µm and D90 of 93.2 µm.

A proportion of the powder is doped with 150 ppm of phosphorus by impregnation with a phosphoric acid solution and drying.

Both phosphorus-doped and undoped samples of the tantalum powder are then initially deoxidised by addition of 1.5-times the stoichiometric quantity of magnesium chips and heating for two hours to the deoxidation temperature stated in Table 1 and, after cooling, are rubbed through a 300 µm mesh size screen.

The following powder characteristics or parameters are stated in Table 1:

Deox.-T. denotes the temperature at which deoxidation was performed.

"Bulk density" was determined to ASTM B 329 with a Scott Volumeter.

"FSSS" denotes the average grain diameter determined to ASTM B 330 by means of a Fisher Sub Sieve Sizer.

Compressive strength was determined using a Chatillon dynamometer on a compressed powder pellet 5.1 mm in length and 5.1 mm in diameter with a compressed density of 5.0 g/cm$^3$.

"BET" denotes the specific surface area determined by the known Brunauer, Emmett and Teller method.

"Flowability" ("Hall flow") is the time in seconds taken for 25 g of powder to flow through a ¹⁄₁₀", funnel to ASTM B 213.

"Mastersizer D10, D50 and D90" denote 10th, 50th and 90th mass percentiles of the grain size distribution of the powder determined to ASTM B 822 by laser diffraction using the Mastersizer Sµ instrument from Malvern, once without and once with ultrasonication.

Compression mouldings of dimensions 3 mm in diameter and 3.96 mm in length with a compressed density of 5.0 g/cm$^3$ were produced from the powders, a 0.2 mm diameter tantalum wire being placed axially in the die as a contact wire before introduction of the powder. The compression mouldings are sintered for 10 minutes under a high vacuum at the sintering temperature stated in the Table to form anodes.

The "wire pull-out strength" was determined as follows: the anode wire is passed through a 0.25 mm diameter aperture in a retaining plate and the fee end is clamped into the jaws of a Chatillon dynamometer Force is then applied until the wire is pulled out of the anode structure.

The anode bodies are immersed in 0.1% phosphoric acid and, with current intensity limited to 150 mA, formed up to a forming voltage of 30 V. After the current intensity has dropped, the voltage is maintained for one hour further. A cathode of 18% sulfuric acid is used to measure capacitor properties-Measurement was performed with a 120 Hz alternating voltage.

Specific capacitance and residual current are stated in Table 1.

"Dielectric strength" was additionally determined as follows: the anode bodies are immersed in 0.1% phosphoric acid and formed at a constant current intensity until a sudden drop in voltage occurs.

2. A powder according to claim 1, wherein the powder has a content of
P<30 ppm,
N<400 ppm,
B<10 ppm,
Si<20 ppm,
S<10 ppm, and
As<10 ppm.

3. A powder according to claim 2, wherein the powder has a content of
P<10 ppm and
N<300 ppm.

4. A powder according to claim 3, wherein the powder has a content of
N<100 ppm.

TABLE 1

| | | Ex. no. | | | | | | | | | |
|---|---|---|---|---|---|---|---|---|---|---|---|
| | | 1 | 2 | 3 | 4 | 5 | 6 | 7 | 8 | 9 | 10 |
| Powder characteristics: | | | | | | | | | | | |
| P doping | | — | — | — | — | — | — | yes | yes | yes | yes |
| Deox.-T. | °C. | 800 | 825 | 850 | 875 | 900 | 950 | 850 | 875 | 900 | 950 |
| Bulk density | g/inch$^3$ | 26.7 | 27.4 | 27.5 | 27.8 | 27.6 | 28.8 | 28.4 | 28.3 | 27.5 | 28.8 |
| FSSS | µm | 2.20 | 2.08 | 2.14 | 2.17 | 2.21 | 2.45 | 1.89 | 2.07 | 2.11 | 2.36 |
| Compressive strength | kg | 4.1 | 4.3 | 4.3 | 4.6 | 4.3 | 5.8 | 2.7 | 3.4 | 3.6 | 5.3 |
| BET | m$^2$/g | 2.13 | 1.84 | 1.67 | 1.46 | 1.42 | 1.29 | 2.08 | 1.79 | 1.61 | 1.43 |
| Flowability | s | 20.0 | 21.0 | 21.0 | 22.5 | 20.0 | 21.0 | 21.0 | 23.0 | 21.0 | 22.0 |
| Mastersizer without ultrasound µm | D10 | 18.7 | 37.9 | 18.1 | 17.7 | 18.0 | 18.1 | 17.0 | 17.2 | 17.4 | 17.9 |
| | D50 | 32.3 | 33.1 | 33.2 | 33.0 | 33.1 | 32.9 | 31.3 | 32.3 | 32.2 | 33.0 |
| | D90 | 187 | 148 | 192 | 165 | 171 | 179 | 56.8 | 68.2 | 67.7 | 125 |
| Mastersizer with ultrasound µm | D10 | 2.1 | 3.1 | 3.6 | 5.9 | 12.8 | 13.8 | 1.2 | 1.8 | 5.04 | 10.6 |
| | D50 | 25.3 | 26.0 | 26.1 | 26.6 | 29.2 | 28.6 | 23.1 | 24.4 | 26.1 | 28.0 |
| | D90 | 36.2 | 39.5 | 40.7 | 45.3 | 50.16 | 48.2 | 41.1 | 42.2 | 45.1 | 47.5 |
| Chemical analysis ppm | C | 24 | 26 | 23 | 23 | 25 | 28 | 24 | 21 | 25 | 29 |
| | H | 169 | 181 | 178 | 142 | 104 | 71 | 222 | 192 | 149 | 88 |
| | Mg | 21 | 19 | 18 | 23 | 22 | 35 | 20 | 18 | 18 | 40 |
| | N | 231 | 258 | 224 | 228 | 243 | 296 | 287 | 270 | 299 | 350 |
| | O | 6247 | 5861 | 5421 | 4779 | 4709 | 3809 | 5997 | 5486 | 5009 | 4301 |
| | P | 9 | 9 | 9 | 9 | 9 | 9 | 155 | 155 | 155 | 150 |
| | Na | <0.5 | <0.5 | <0.5 | <0.5 | <0.5 | <0.5 | <0.5 | <0.5 | <0.5 | <0.5 |
| | K | <0.5 | <0.5 | <0.5 | <0.5 | <0.5 | <0.5 | <0.5 | <0.5 | <0.5 | <0.5 |
| | Fe | 16 | 17 | 14 | 18 | 16 | 18 | 21 | 20 | 15 | 16 |
| | Cr | 4 | 7 | 5 | 5 | 4 | 4 | 5 | 5 | 4 | 3 |
| | Ni | <3 | <3 | <3 | <3 | <3 | <3 | <3 | <3 | <3 | <3 |
| Anode: | | | | | | | | | | | |
| Sintering temp. | °C. | 1310 | 1.310 | 1310 | 1350 | 1310 | 1310 | 1410 | 1410 | 1410 | 1410 |
| Wire pull-out strength | kg | 35.9 | 33.6 | 30.6 | 24.4 | 22.8 | 17.9 | 30.5 | 31.7 | 24.0 | 30.1 |
| Capacitor: electrical properties: | | | | | | | | | | | |
| Spec. capacitance | µFV/g | 95431 | 87989 | 85508 | 84753 | 83355 | 77775 | 87593 | 87690 | 87187 | 78110 |
| Spec. residual current | nA/µFV | 0.64 | 0.62 | 0.55 | 0.50 | 0.58 | 0.47 | 0.65 | 0.76 | 0.57 | 1.58 |
| Dielectric strength | V | >300 | >300 | >300 | >300 | >300 | >300 | 279 | 284 | 265 | 253 |

The invention claimed is:

1. A tantalum powder consisting of agglomerated primary particle with a minimum primary particle dimension of 0.2 to 0.8 µm, a specific surface area of 0.9 to 2.5 m$^2$/g and a particle size distribution determined to ASTM B 822 corresponding to a D10 value of 5 to 25 µm, a D50 value of 20 to 140 µm and a D90 value of 40 to 250 µm, wherein the powder does not comprise and effective content of sintering protection agents.

5. A tantalum powder according to 4, which after pressing into a cylindrical shape with a diameter of 5.1 mm and a length of 5.1 mm and a compressed density of 5.0 g/cm$^3$, exhibits a Chatillon compressive strength of greater than 5 kg.

6. A tantalum powder according to 1, which after pressing into a cylindrical shape with a diameter of 5.1 mm and a length of 5.1 mm and a compressed density of 5.0 g/cm$^3$, exhibits a Chatillon compressive strength of greater than 4 kg.

7. A tantalum powder according to 1, which after pressing into a cylindrical shape with a diameter of 5.1 mm and a length of 5.1 mm and a compressed density of 5.0 g/cm$^3$, exhibits a Chatillon compressive strength of greater than 5 kg.

8. A solid electrolyte capacitor anode of tantalum with a specific surface area active as a capacitor of 0.5 to 1 m$^2$/g, which comprises substantially no sintering protection agents and wherein said anode having a specific capacitance of 40,000 to 150,000 μFV/g and a specific residual current of less than 1 nA/μ FV.

9. A solid electrolyte capacitor anode according to claim 8, with a wire pull-out strength of greater than 30 kg.

10. A solid electrolyte capacitor anode according to claim 9, with specific capacitance of 70,000 to 150,000 μFV/g and a specific residual current of less than 1 nA/μ FV.

* * * * *